US012719878B2

(12) United States Patent
Nigam

(10) Patent No.: US 12,719,878 B2
(45) Date of Patent: Aug. 25, 2026

(54) MAINFRAME AUTHENTICATION AND MONITORING SYSTEM WITH ENHANCED SECURITY

(71) Applicant: Cigna Intellectual Property, Inc., Wilmington, DE (US)

(72) Inventor: Shantul Nigam, Avon, CT (US)

(73) Assignee: Cigna Intellectual Property, Inc., Wilmington, DE (US)

(*) Notice: Subject to any disclaimer, the term of this patent is extended or adjusted under 35 U.S.C. 154(b) by 168 days.

(21) Appl. No.: 18/371,573

(22) Filed: Sep. 22, 2023

(65) Prior Publication Data

US 2025/0106215 A1 Mar. 27, 2025

(51) Int. Cl.
*H04L 9/40* (2022.01)
*H04L 67/141* (2022.01)

(52) U.S. Cl.
CPC .......... *H04L 63/102* (2013.01); *H04L 63/105* (2013.01); *H04L 67/141* (2013.01)

(58) Field of Classification Search
CPC .... H04L 63/102; H04L 63/105; H04L 67/141
See application file for complete search history.

(56) References Cited

U.S. PATENT DOCUMENTS 5,305,456 A 4/1994 Boitana
6,070,243 A * 5/2000 See ........................ H04L 63/08 709/229
6,279,111 B1 * 8/2001 Jensenworth ....... G06F 21/6218 713/172
6,785,729 B1 * 8/2004 Overby, Jr. ......... H04L 63/0823 709/225
7,376,958 B1 5/2008 Klingman
7,702,785 B2 * 4/2010 Bruton, III ............ H04L 63/105 709/225
7,764,682 B2 7/2010 Sievert
8,069,435 B1 11/2011 Lai
8,473,604 B2 6/2013 Misra
8,601,541 B2 12/2013 Radhakrishnan
9,542,549 B2 1/2017 Gonzalez
9,715,399 B2 7/2017 Yaffe
10,069,814 B2 9/2018 Kaladgi
(Continued)

FOREIGN PATENT DOCUMENTS

WO 2005069823 A2 8/2005
WO 2007141082 A1 12/2007
WO 2017020089 A1 2/2017

*Primary Examiner* — Michael Won
(74) *Attorney, Agent, or Firm* — Jordan IP Law PC

(57) ABSTRACT

Apparatuses, systems, and methods relate to technology to identify a first user identification, where the first user identification is associated with an application. The technology determines that the first user identification is associated with a second user identification, where the second user identification is associated with a mainframe. The technology stores the first user identification in association with the second user identification into a storage, identifies a request to access the mainframe, wherein the request is associated with the first user identification, accesses the storage to identify the second user identification based on the first user identification, and generates a first session to access the mainframe based on the second user identification, where the first session is dedicated to tasks associated with the second user identification.

17 Claims, 8 Drawing Sheets

(56) References Cited

U.S. PATENT DOCUMENTS 10,303,892 B1 * 5/2019 Lim ..................... G06F 16/986
10,462,148 B2 10/2019 Saxena
10,521,266 B1 12/2019 Sigl, Sr.
10,574,644 B2 2/2020 Ananthapur Bache
10,726,145 B2 7/2020 Duminy
11,836,690 B1 * 12/2023 Stroke .................. G06Q 20/401
2007/0208744 A1 * 9/2007 Krishnaprasad .... H04L 63/0815 707/999.009
2010/0005504 A1 1/2010 Gottimukkala
2011/0239289 A1 * 9/2011 Wang ...................... H04L 63/10 709/224
2012/0249292 A1 * 10/2012 Wong .................. H04L 63/0853 340/5.52
2014/0365781 A1 * 12/2014 Dmitrienko ........... G06F 21/335 713/185
2015/0128237 A1 * 5/2015 Lund ......................... H04L 9/32 726/7
2016/0044013 A1 2/2016 Belov
2016/0105446 A1 * 4/2016 Chen ..................... H04L 67/141 726/1
2017/0054565 A1 2/2017 Feng
2017/0054712 A1 2/2017 Wetter
2017/0337355 A1 * 11/2017 Biswas ..................... G06F 8/60
2017/0353444 A1 * 12/2017 Karangutkar ........... G06F 21/41
2018/0026893 A1 1/2018 Jeuk
2018/0159839 A1 * 6/2018 Citron ................... H04W 12/06
2018/0343215 A1 * 11/2018 Ganapathi ............. G06F 16/954
2019/0132304 A1 5/2019 Overby
2019/0306172 A1 * 10/2019 Dande ................... H04L 63/102
2020/0067907 A1 * 2/2020 Avetisov ............... H04L 67/133
2020/0067911 A1 * 2/2020 Ishikawa ............. H04L 63/0815
2020/0099683 A1 * 3/2020 Alexander .............. G06F 21/30
2021/0081947 A1 * 3/2021 Hockey .............. G06Q 20/4014
2021/0144139 A1 * 5/2021 Bouvet ................. H04L 63/101
2021/0273943 A1 * 9/2021 Oomori ................... H04M 1/00
2021/0281610 A1 * 9/2021 Applegate-Swanson .................... H04L 63/20
2021/0297405 A1 * 9/2021 Ide ........................ H04L 63/083
2021/0336944 A1 * 10/2021 Brinckman ........... H04L 67/306
2021/0390170 A1 * 12/2021 Olden ..................... H04L 63/08
2022/0124098 A1 4/2022 Shiralkar
2022/0272098 A1 * 8/2022 Muthukrishnan ... H04L 61/3025
2022/0353262 A1 11/2022 Zeller
2024/0129285 A1 * 4/2024 Ead ......................... H04L 45/76

* cited by examiner

MAINFRAME AUTHENTICATION AND MONITORING SYSTEM WITH ENHANCED SECURITY

TECHNICAL FIELD

The present disclosure relates to an enhanced authentication system to track and monitor user activities in a mainframe architecture. In detail, examples can generate mainframe identifications that are each assigned to a single user, and generate individual and independent sessions based on the mainframe identifications.

BACKGROUND

Mainframes are high-performance computers with large amounts of memory and processors. Mainframes can process billions of calculations and transactions in real time. Mainframes are utilized in different applications, such as commercial databases, transaction servers, and applications that require high resiliency, security and agility.

BRIEF DESCRIPTION OF THE SEVERAL VIEWS OF THE DRAWINGS

The various advantages of the embodiments of the present disclosure will become apparent to one skilled in the art by reading the following specification and appended claims, and by referencing the following drawings, in which:

DETAILED DESCRIPTION

Figure 1:
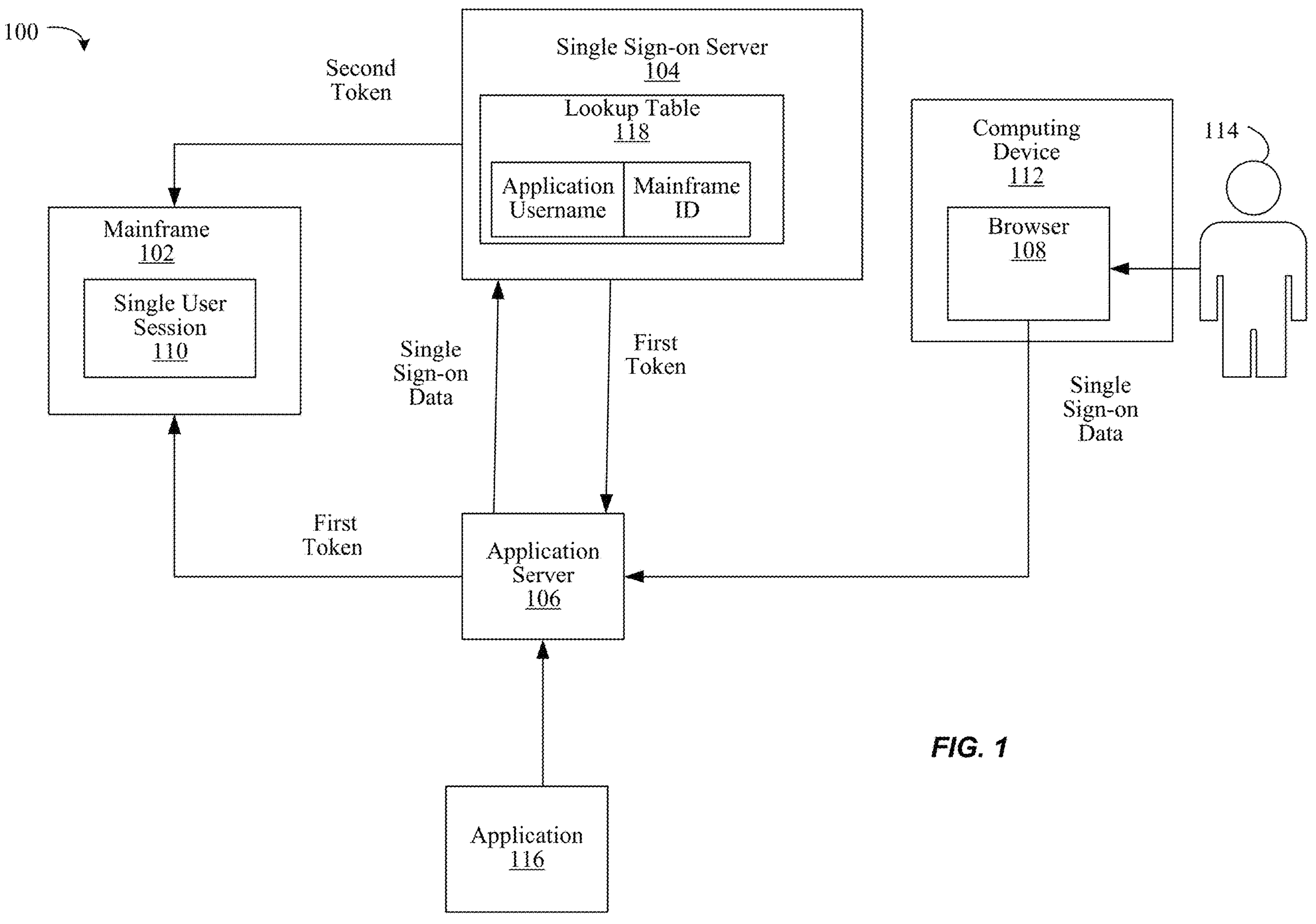
FIG. 1 is a diagram of an example of a single sign-on process according to an embodiment.

Mainframes are power computational tools that can be uniquely engineered to run common operating systems, specialized operating systems, and software that takes advantage of unique hardware capabilities. Mainframes support massive simultaneous transactions and throughput (I/O) (e.g., 1 trillion secure web transactions) with built-in capacity on demand and built-in shared memory for direct application communication. Mainframes can deliver high levels of security per day and manage privacy by policy. Mainframes can provide resiliency through multiple layers of redundancy for every component (power supplies, cooling, backup batteries, central processing units (CPUs), inputs/outputs (I/O) components, cryptography modules) and testing for extreme weather conditions. Mainframes can also store vast amounts of data and execute massive amounts of transactions on the data.

Security in mainframes is an area of interest considering the volume of information stored by mainframes, the processing power and the number of processes that mainframes execute. Previously existing implementations lack proper security mechanisms resulting in inefficiency, data misuse and sub-optimal performance.

For example, some previously existing implementations can provide a single-user process. The single-user process can only allow a single user access to the mainframe to perform tasks. The single-user process is developed to be used on a single system (e.g., mainframe) and to provide security to the user. Doing so however can hinder the ability of multiple users to access the mainframe in parallel, diminishing performance and efficiency, and failing to realize the full potential of the mainframe.

Service identification (ID) logon processes can be used to authenticate users, in a multi-user process, but doing so in previously existing implementations can fail to meet some specific requirements and result in sub-optimal efficiency. For example, in previously existing implementations, service IDs are generic and can be shared among many different users. A service ID can be a standard way to connect to the other systems. The calling system (e.g., an application server) is viewed as a single user on the mainframe, and limits many of the control and throttling controls built into the mainframe as will be explained below. Service IDs and corresponding passwords are often managed within a calling process of the calling system. For example, service ID logon processes can include confirming a single service ID to permit access, where the single service ID is used by several users. Thus, security risks are managed by a single service ID (which is shared among many different users) and tracing actions at an individual level can be difficult, if not impossible to do.

Furthermore, in some cases a session associated with a single service ID is generated. The session can execute tasks and processes to modify the mainframe on behalf of the users. Thus, different users of the users can initiate the processes via the session and the single service ID. A first user of the different users can execute a process that is identified as being unauthorized usage (e.g., process consumes an excessive amount of memory, unauthorized access to data, unauthorized action, etc.), and flagged to be terminated. In order to do so, the session can be terminated, resulting in all processes of the session (even those that originate with other users of the different users) being terminated. Doing so can reduce efficiency since processes associated with normal usage (e.g., that originate from the other users) are also terminated. Moreover, the other users can be particularly frustrated since the other users did not initiate any unauthorized usage, and yet lose significant amounts of work since all processes of the session (including processes associated with the other users) are terminated. Furthermore, if the session ID is locked out to prevent further unauthorized usage, all the different users will effectively lose the ability to access the mainframe, hindering performance and resulting in over-correction. Thus, previously existing implementations limit the ability of a system to respond to security risks at a granular and individual level, inefficiently address security threats, lack the ability to lock-out individual users and are inefficient.

Furthermore, granular and individual access privileges can be difficult if not impossible to enact in previously existing implementations, particularly previously existing implementations that are based on service IDs. For example, an application hosted on an application server can access a mainframe with the service ID. The application is granted access to all resources that an application uses to execute any process for any user. As noted above, several users can all access the same single service ID. In theory, the users should have varying groups and roles that have different accesses, capabilities and permissions to work with secured functions to limit user actions. In reality, the service ID grants access to a broad range of accesses, capabilities and actions to avoid limiting the actions of a most privileged user. That is, rather than limiting access to the lowest privileged group and/or role, the single service ID can have a broad range of access privileges so that the most privileged users can perform different actions without limitations. Thus, even entry level users are able to access and modify resources that only advanced users should be able to access and modify. As such, at least some of the users are granted access permissions that far exceed their roles, groups and/or actions. Furthermore, if the service ID is somehow misappropriated (e.g., hacked), nefarious actors are able to execute a broad range of actions to access numerous resources.

Furthermore, previously existing implementations can execute an authentication process to verify mainframe IDs. A mainframe ID is not available outside the mainframe. The mainframe controls access and is able to throttle usage as needed including monitoring for potential excessive use. Each mainframe ID can be associated with a single user (e.g., a single user uses the mainframe ID for authentication processes such as logging into the mainframe, authorizing executables in the mainframe, or the like). The authentication process can include screen scraping to verify the mainframe ID. Screen scraping however presents several technical challenges. In particular, screen scraping is not a stable technology. For example, the authentication process fails if any element (e.g., as presented on a graphical user interface to login) is moved. Thus, all elements must remain stationary, or a failed authentication process occurs. Furthermore, screen scraping technology often requires non-standard software (e.g., Terminal Emulation software that is able to provide data between the mainframe and a user device) as middleware to provide a virtual screen on the user device which can be used for processing, resulting in poor performance and degraded useability.

Previously existing implementations further called different application to manage security for service IDs. That is, managing security in previously existing implementations utilized third-party applications which increases latency, overhead and compute resources.

Furthermore, existing implementations require multiple authentications (e.g., at an application level and a mainframe level) consuming compute resources, increasing latency and user resources. For example, a user can first login into an application, and then login into the mainframe. Doing so can be cumbersome and inefficient.

Thus, previously existing implementations lacked security, failed to provide limited access privileges, and were unable to track users on an individual level in a multi-user environment. Moreover, previously existing implementations lacked the ability to implement a single-user sign on to access the mainframe and an application, and further included unstable logon processes.

Examples as described herein relate to an enhanced and secure technological environment to track, monitor and enforce access privileges on an individual user basis. In detail, examples relate to an enhanced computing system that executes a single sign-on process to authenticate users onto an application and mainframe. Furthermore, examples can provide unique IDs (e.g., mainframe IDs) to the users to track and monitor users, as well as enforce access privileges on an individual basis. Doing so can reduce compute resources, enhance security by limiting access permissions, and enhance efficiency by enforcing access permissions on a per user basis (e.g., termination of a session only affects one individual rather than many users). Moreover, the single-sing on process described herein provides a more stable process to access the mainframe, relative to other technologies such as screen scraping.

Turning now to FIG. 1, a single sign-on process 100 to access mainframe 102 is illustrated. In this example, a single login can be used to authenticate the user both for application services as well as for the mainframe. Notably the single sign-on process 100 is a stable, efficient and granular process to authenticate and track users accessing the mainframe 102.

In detail, a computing device 112 (e.g., desktop, laptop, server, mobile device, tablet, etc.) can be connected to an application server 106. The application server 106 can host an application 116. That is, the application server 106 can execute the application 116. The application 116 can access the mainframe 102 to execute certain actions (e.g., read data, write data, modify existing data, perform functions, etc.), tasks and/or processes. The computing device 112 can remotely command the application 116 to cause the actions, tasks and/or processes to be executed on the mainframe 102. A user 114 can interact with a browser 108 and/or computing device 112 to provide commands to the application 116.

The user 114 and/or the computing device 112 can be authenticated prior to gaining full access to the functionality of the application 116 during an authentication process. For example, the computing device 112 can present the browser 108 to the user 114. The browser 108 provides access to the application server 106 and/or the application 116. The computing device 112 can communicate with the application server 106 over a communication path (e.g., network, internet, etc.). The user 114 can provide single sign-on data to the application server 106 via the browser 108 to login to the application 116. The single sign-on data can include first user identification (e.g., a non-mainframe ID, password, and/or other authentication details). For example, the first user identification can include an application username (e.g., a non-mainframe identification, local area network ID, and/or first user identification) and password. The single sign-on data can be used to authenticate the user 114 and/or computing device 112 to access both the application 116 and the mainframe 102. The application username can be an identification generated to login to the application 116.

For example, initially the computing device 112 cannot access the full functionality of the application 116 until authentication is executed to verify the identity of the user 114. For example, the user 114 can provide the single sign-on data (e.g., first user identification such as username and/or password) to verify an identity of the user 114. The single sign-on data is provided to the application server 106. The application server 106 can operate in conjunction with the single sign-on server 104 to verify that the single sign-on data matches records of the single sign-on server 104. For example, the single sign-on server 104 can verify that the application username and password of the single sign-on data matches a stored password and application username associated with the user 114. If a match is determined, the application 116 is unlocked and the computing device 112 is granted access to the functionality of the application 116. Otherwise, the application 116 is locked and the computing device 112 is denied access to the application 116.

In this example, the single sign-on server 104 verifies that the single sign-on data matches the records of the single sign-on server 104. Thus, the computing device 112 is granted access to the application 116. The single sign-on server 104 can extract the application username and password from the single sign-on data.

In some examples, the application server 106 authenticates the single sign-on data, and provides at least part of the single sign-on data to the single sign-on server when the single sign-on data is authenticated (e.g., verified). If the single sign-on data was not verified, the application server 106 would not provide the at least the part of single sign-on data to the single sign-on server 104.

In this example, the single sign-on server 104 can execute an association process to periodically retrieve mainframe IDs from the mainframe 102 and associate the mainframe IDs with application usernames. For example, the mainframe 102 can generate new mainframe IDs (e.g., second user identifications that can be mainframe usernames) for new users with an access controller (e.g., Resource Access Control Facility® (RACF®)). The single sign-on server 104 can retrieve the mainframe IDs from the mainframe 102 and store the mainframe IDs in association with corresponding application usernames (e.g., first user identifications). For example, the single sign-on server 104 can use common attributes (e.g., actions associated with a particular application username and mainframe ID) between the mainframe IDs and the application usernames (e.g., non-mainframe IDs) to determine that the application username corresponds to the mainframe ID. The common attributes can include any metadata that may relate a corresponding application username to a corresponding mainframe ID. The common attributes can be shared by and common to the corresponding application username and the corresponding mainframe ID (e.g., the application username and mainframe ID each include the common attributes). Some examples of common attributes can include employee identification number, employee name, and other unique employee identification information (e.g., social security number, driver's license number, employee title, etc.). The common attributes can include other identifiable attributes maintained within the mainframe 102, single sign-on server 104 and application server 106. For example, a mainframe ID can be associated with a respective application username when the mainframe ID and the respective application username each contain the common attribute(s).

Thus, the single sign-on server 104 can automatically retrieve mainframe IDs from the mainframe 102, and associate the retrieved mainframe IDs with corresponding application usernames (e.g., login data). The above association process can execute prior to the single sign-on data being identified and/or received during the authentication process for the application 116. That is, the association process can execute prior to the authentication process for the application 116 being executed.

In this example, the application username of the single sign-on data is associated with the mainframe ID. Notably, the mainframe ID is stored in a storage of the single sign-on server 104 and in the mainframe 102. As such, the mainframe ID is stored in two locations, with one of the locations being outside the mainframe 102. The mainframe ID and application username can be associated together in a lookup table 118.

The single sign-on server 104 can extract the application username and password from the single sign-on data. The single sign-on server 104 can then authenticate the application username (e.g., first user identification) and password.

The single sign-on server 104 can further identify the mainframe ID by looking up the application username in the lookup table 118, and identifying that the mainframe ID is associated with the application username. Based on the association and the authentication of the application username and password, the single sign-on server 104 can generate a first token that includes the mainframe ID. Some attributes can be encoded, encrypted and/or maintained confidentially so that the application server 106 cannot ascertain the attributes to enhance security. For example, only the attributes needed by the application 116 will be provided by the first token. For example, the mainframe 102 will not obtain a local area network identification of the user 114 since the single sign-on server 104 only needs the user's mainframe ID.

The first token can be provided to the application server 106. The application server 106 then provides the first token to the mainframe 102 along with a request to access the mainframe 102. The request can be a request for the application 116 to access the mainframe 102

The mainframe 102 can receive the first token. The mainframe 102 can initiate a verification process to verify that the first token and the mainframe ID are valid. For example, the mainframe 102 can decode the first token to extract the mainframe ID from the first token. The mainframe 102 can then request that the single sign-on server 104 provide a validation of the first token. In response, the single sign-on server 104 can provide a second token that is the same as the first token provided with a different filter on the information. The first token itself is unique so examples maintain the first token as part of the process (e.g., for transaction identification). For example, the mainframe 102 can provide the mainframe ID to the single sign-on server 104, and request that the single sign-on server 104 provide the token (the second token) associated with the mainframe ID. If the first and second tokens match, then the first token is deemed to correspond to an authentic request to access the mainframe 102 and access is granted to the application server 106, application 116, computing device 112 and/or browser 108. If the first token and the second token do not match, then the first token is deemed to correspond to an inauthentic request and access to the mainframe 102 is not granted to the application server 106, application 116, computing device 112 and/or browser 108.

If the first and second token match (i.e., the token corresponds to an authentic request), the mainframe 102 can also validate the mainframe ID. For example, mainframe ID can be authenticated against an internal storage of the mainframe 102 that stores all mainframe IDs that are permitted to access the mainframe 102 (e.g., a data storage such as a solid-state drive, memory, hard drive, etc.).

In this example, the mainframe 102 verifies during the verification process that the mainframe ID is valid, and therefore determines that the single user session 110 is to be generated based on the verification process. Thus, the mainframe 102 generates the single user session 110. Otherwise, the process 100 is terminated. In this example, the mainframe 102 verifies that the mainframe ID is valid, and thus, the single user session 110 is generated.

The single user session 110 can execute tasks and/or processes. For example, the user 114 can issue a command through the browser 108. The command can be transmitted to the application 116 on the application server 106. The application server 106 can embed the first token into a communication that includes the command, and transmit the communication to the mainframe 102. The mainframe 102 can receive the communication, extract the first token and the command, verify the first token (as described above) extracted from the communication, and then provide the command extracted from the communication to the single user session 110 that in turn executes the command.

The single user session 110 is specific to mainframe ID, as well as the computing device 112 and/or user 114. That is, the single user session 110 is dedicated to the mainframe ID so that the single user session 110 cannot be accessed by other users and is instead only associated with the particular mainframe ID of the user 114. That is, other processes and/or tasks of other mainframe IDs cannot be executed in the single user session 110. Rather the other processes and/or tasks can have independently operated sessions (e.g., each mainframe ID has a unqiue mainframe session). In doing so, actions can be tracked on a user-by-user basis. Furthermore, the single user session 110 can be terminated if needed without affecting the workflows of other users. Moreover, examples can conduct an automatic login process for the user 114 that can reliably (e.g., without screen scraping) and safely (can accurately authenticate and verify) based on user credentials.

The mainframe 102 can also enforce access privileges specific to the single user session 110 and/or the mainframe ID. In doing so, granular access permissions are enforced such that the user is only granted a subset of access permissions for the mainframe 102. Thus, users can have varying levels of access depending on the access permissions granted to the users. As such, each caller (e.g., different users) has a unique ID on the mainframe 102. The mainframe 102 is able to evaluate the ID and determine access permissions. As such, security risks can be managed at the individual ID level.

It is worth noting that the mainframe 102, single sign-on server 104, application server 106 and computing device 112 can communicate over a network(s). The network(s) can include, or operate in conjunction with, an ad hoc network, an intranet, an extranet, a virtual private network (VPN), a local area network (LAN), a wireless network, a low energy Bluetooth (BLE) connection, a WiFi direct connection, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network can include a wireless or cellular network and the coupling can be a Code Division Multiple Access (CDMA) connection, a Global System for Mobile communications (GSM) connection, or other type of cellular or wireless coupling. In this example, the coupling can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

Thus, examples herein can identify a first user identification (e.g., the application username), where the first user identification is associated with the application 116. Examples further determine that the first user identification is associated with a second user identification (e.g., the mainframe ID that is a mainframe username), where the second user identification is associated with the mainframe 102. Examples store the first user identification (e.g., application username) in association with the second user identification (e.g., the mainframe ID) into a storage of the single sign-on server 104. Examples identify a request to access the mainframe 102, where the request is associated with the first user identification (e.g., the request includes the first user identification). For example, the request can be part of an authentication process to access the application 116. That is, since the application 116 can access the mainframe 102, the authentication process for the application 116 can include automatically authenticating the user 114 for mainframe 102 access. Examples then access the storage of the single sign-on server 104 to identify the second user identification (e.g., the mainframe ID) based on the first user identification (e.g., application username), and generate a single user session 110 (e.g., a first session) to access the mainframe 102 based on the second user identification (e.g., the mainframe ID), wherein the single user session 110 is dedicated to tasks associated with the second user identification (e.g., the mainframe ID). Doing so can enhance performance, efficiency and security (e.g., each user is associated with a different session) as mentioned above.

Aspects of the single sign-on process 100 can be implemented be implemented in logic instructions (e.g., software), configurable logic, fixed-functionality hardware logic, computer readable instructions stored on at least one non-transitory computer readable storage medium that are executable to implement the single sign-on process 100, circuitry, etc., or any combination thereof. The single sign-on process 100 can be a computing architecture, in which any of the components are executed in logic instructions (e.g., software), configurable logic, fixed-functionality hardware logic, computer readable instructions stored on at least one non-transitory computer readable storage medium that are executable to implement the single sign-on process 100, circuitry, etc., or any combination thereof.

Figure 2:
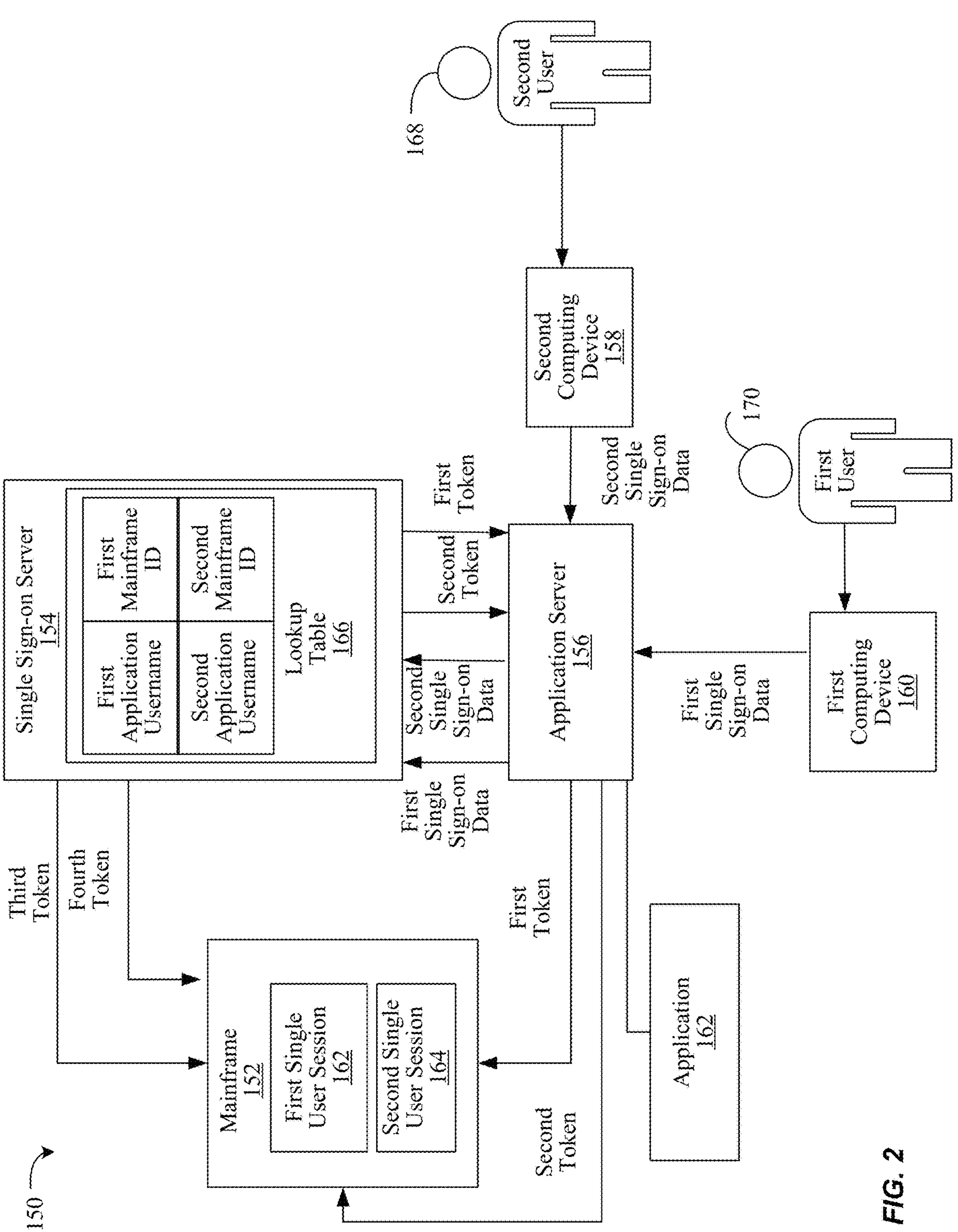
FIG. 2 is a diagram of an example of a multi-user single sign-on according to an embodiment.

Turning now to FIG. 2, a multi-user single sign-on process 150 is illustrated. The multi-user single sign-on process 150 can generally be implemented in conjunction with any of the embodiments described herein, for example the single sign-on process 100 (FIG. 1). In this example, first and second users 168, 170 are authenticated to gain access to an application 148 similarly to as described above with respect to the single sign-on process 100. That is, the first user 168 can provide first single sign-on data (that includes the first application username) through a first computing device 160. The second user 168 provides second single sign-on data (that includes the second application username) through a second computing device 158. The first and second users 168, 170 can sign-in at different times.

The first single sign-on data is provided to the application server 156. The application server 156 provides the first single sign-on data to a single sign-on server 154. The single sign-on server 154 can authenticate the first single sign-on data to permit access to the mainframe 152. For example, the single sign-on server 154 can determine that the first single sign-on data (e.g., a password and first application username combination) match internal records (e.g., a password and first application username combination) of the single sign-on server 154.

The single sign-on server 154 can further access a lookup table 166 to identify that the first application username (e.g., a first user identification) of the first single sign-on data is associated with the first mainframe ID (e.g., a second user identification). The lookup table 166 can be stored in a storage.

In response to the first single sign-on data being authenticated and the first mainframe ID being identified, the single sign-on server 154 can provide a first token to the application server 156 and grant access to the mainframe 152. The first token can include the first mainframe ID in the header of the first token. The first token can be provided to the mainframe 152 which verifies the authenticity of the first token by requesting verification from the single sign-on server 154 based on the first mainframe ID. The single sign-on server 154 provides the third token to the mainframe 152 which can correspond to first mainframe ID. The mainframe 152 can then determine that the first token matches the third token to determine verify that the first token is authentic. The mainframe 152 can then generate a first single user session 162 for the first user to access the mainframe 152. The first single user session 162 and the first mainframe ID (a second user identification) is associated with the first mainframe ID.

Notably, the first single user session can have a first set of access privileges. The first set of access privileges can be individually tailored to the first user 170. For example, the first user 170 can have a first access privileges that is a limited set of access privileges (e.g., standard access privileges that only permit viewing files and modification to certain files). The first access privileges can be enforced on an individual basis and in particular to tasks and/or processes associated with the first mainframe ID.

The second single sign-on data is provided to the application server 156 from the second computing device 158, which provides the second single sign-on data to the single sign-on server 154. The single sign-on server 154 can authenticate the second single sign-on data to provide access to the mainframe 152. For example, the single sign-on server 154 can determine that the second single sign-on data (e.g., a password and second application username combination) match internal records (e.g., a password and second application username combination) of the single sign-on server 154. The single sign-on server 154 can further access the lookup table 166 and the storage to identify that the second application username (e.g., a third user identification) of the second single sign-on data is associated with the second mainframe ID (e.g., a fourth user identification).

In response to the second single sign-on data being authenticated and the second mainframe ID being identified, the single sign-on server 154 can provide a second token to the application server 156 and grant access to the mainframe 152. The second token can include the second mainframe ID in the header of the second token. The second token can be provided to the mainframe 152 which verifies the authenticity of the second token by requesting verification from the single sign-on server 154 based on the second mainframe ID. The single sign-on server 154 provides the fourth token to the mainframe 152. The fourth token corresponds to the second mainframe ID. The mainframe 152 can then determine that the second token matches the fourth token to verify that the second token is authentic. The mainframe 152 can then generate a second single user session 164 dedicated to the second user 168 for the second user 168 to access the mainframe 152. The second single user session 164 is associated with the second mainframe ID.

Notably, the second single user session 164 and the second mainframe ID (e.g., fourth user identification) can have second access privileges different from the first access privileges. The second access privileges can be individually tailored to the second user 168. For example, the second access privileges can be an administrative set of access privileges for the mainframe 152 (e.g., administrative level access to change, modify and view nearly any file). The second access privileges can be enforced on an individual basis and in particular to tasks and/or processes associated with the second mainframe ID.

The second single user session 164 can operate concurrently with and independently from the first single user session 162. For example, restrictions placed on one of the first single user session 162 and the second single user session 164 will not apply to the other of the first single user session 162 and the second single user session 164. Furthermore, every user, including the first and second users 168, 170, is assigned a different mainframe ID and corresponding session to enable granular and individual security enforcement.

For example, suppose that the first user 170 initiates a first action through the first single user session 162 to delete a file. The access privileges of the first single user session 162 can indicate the first user does not have permission to modify the first file. In such a case, the mainframe 102 can identify that the first action of the first session fails to correspond to the first access privileges of the first single user session 162, and terminate the first single user session 162 in response to the first action failing to correspond to the access privileges of the first single user session 162. In such a case, the second single user session 164 can continue to operate after the first session is terminated.

Figure 3:
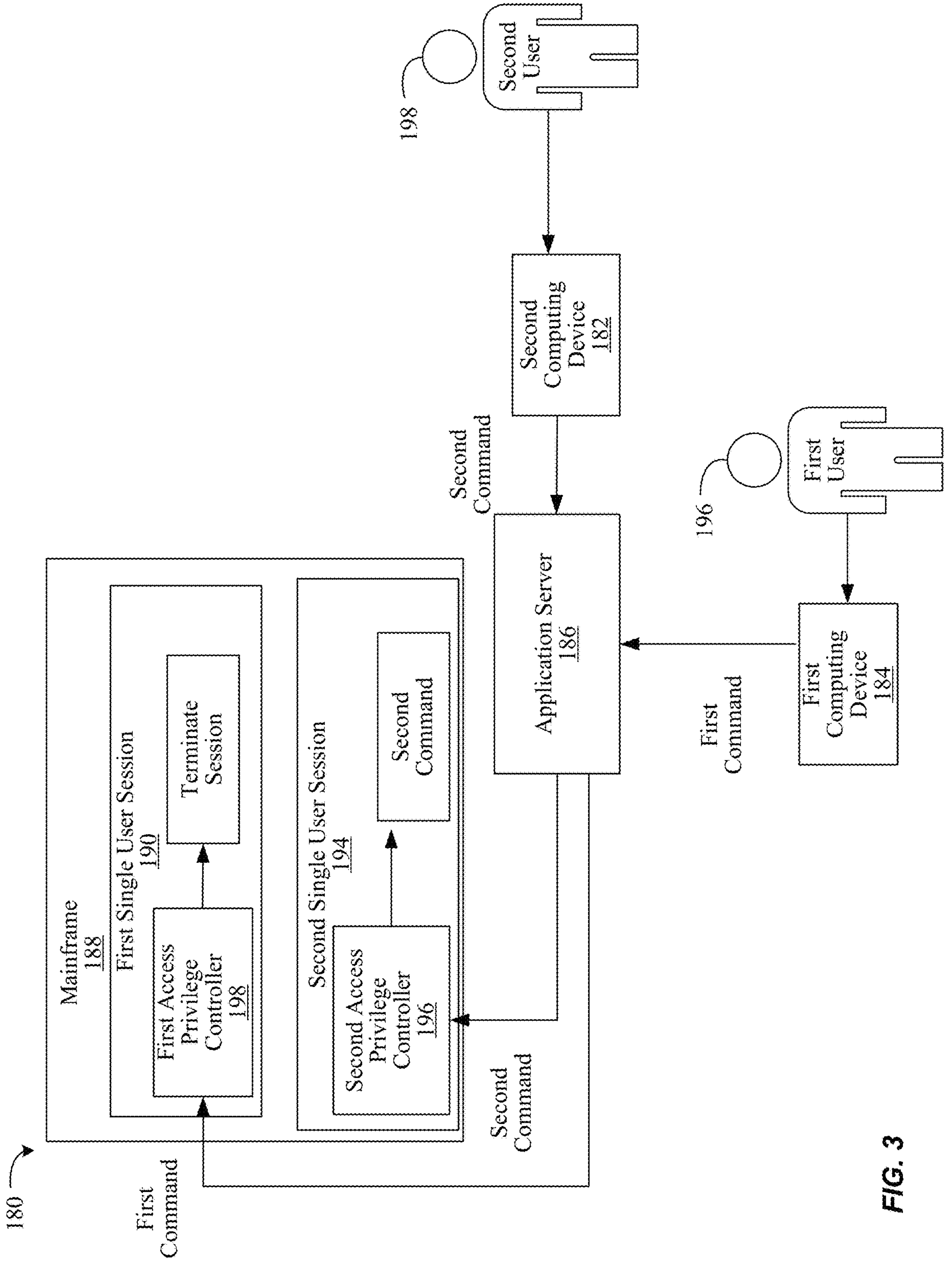
FIG. 3 is a diagram of an example of a process to individually manage user sessions according to an embodiment.

FIG. 3 illustrates a process 180 to individually manage user sessions. The process 180 can generally be implemented in conjunction with any of the embodiments described herein, for example the single sign-on process 100 (FIG. 1) and/or multi-user single sign-on process 150 (FIG. 2).

In this example, first and second user 176, 178 authenticate as described above through the application server 186 to access an application (not illustrated). The mainframe 188 generates first single user session 190 associated with the first computing device 184 and a first mainframe ID of the first user 176. The mainframe 188 further generates a second single user session 194 associated with second computing device 182 and a second mainframe ID of the second user 178.

In this example, the first user 176 provides a first command to the first single user session 190 via the application server 186. Prior to executing the first command, a first access privilege controller 178 can determine whether the first command corresponds to first access privileges of the first single user session 190. In this example, the first command can be deemed to not correspond to the first access privileges, and thus the first single user session 190 is terminated.

The second user can provide a second command to the application server 186 and provide the second command to the second single user session 194. A second access privilege controller 176 can determine whether the second command corresponds to second access privileges of the second single user session 194. In this case, the second command does correspond to the second access privileges, and thus the second access privilege controller 176 permits the second command to be executed. Thus, the second single user session 194 is permitted to execute even after the first single user session 190 is terminated. In some examples, more users can be included that each have a different mainframe ID and session. Each of the sessions operate independently and concurrently so that termination of one session does not affect any other session. Furthermore, each of the sessions is dedicated to a different user. Thus, examples execute a multi-user process to enable a plurality of sessions associated with different users to be executed in parallel and independently of each other.

Figure 4:
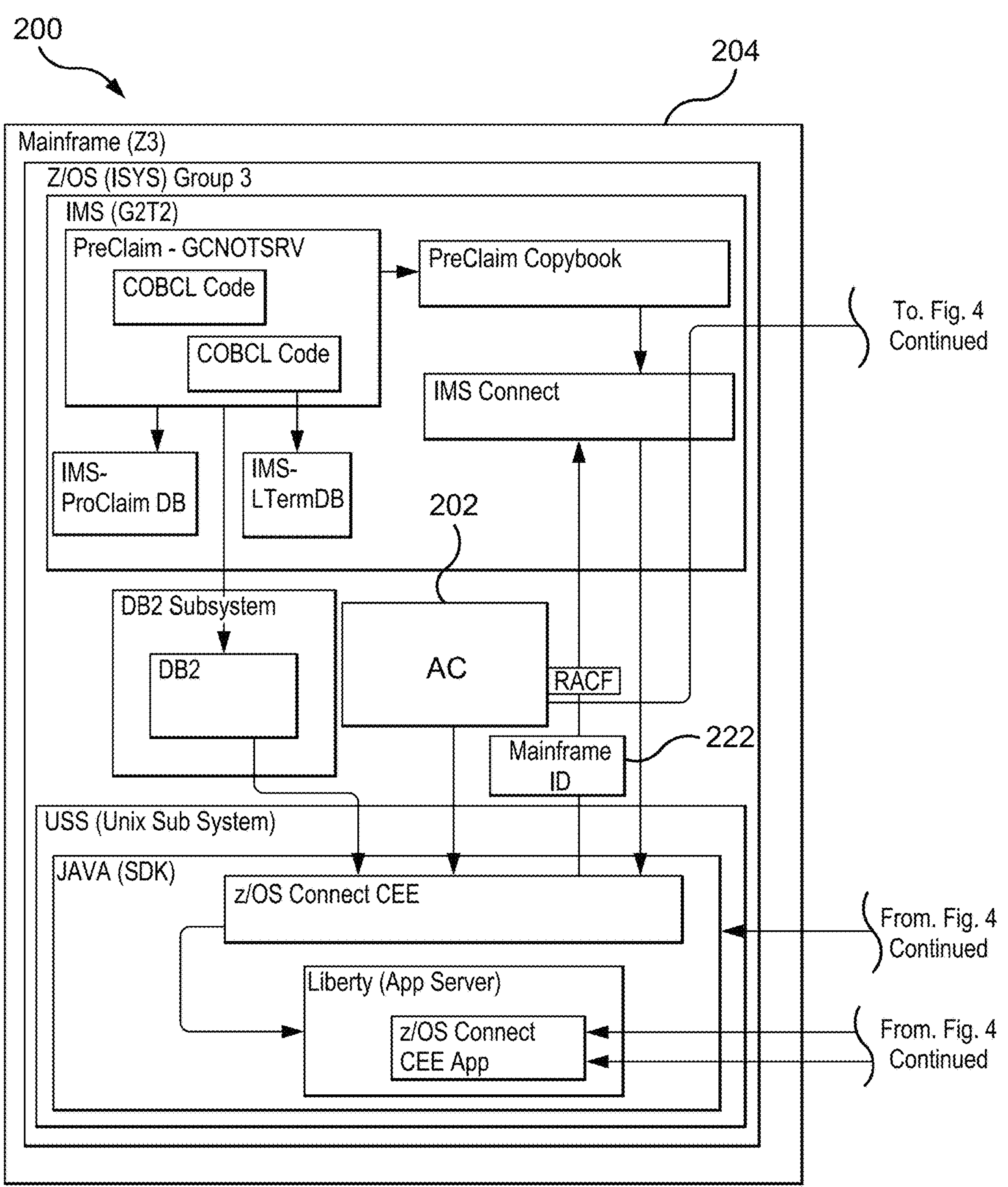
FIG. 4 is a diagram of an example of an authentication architecture according to an embodiment.
Figure 4:
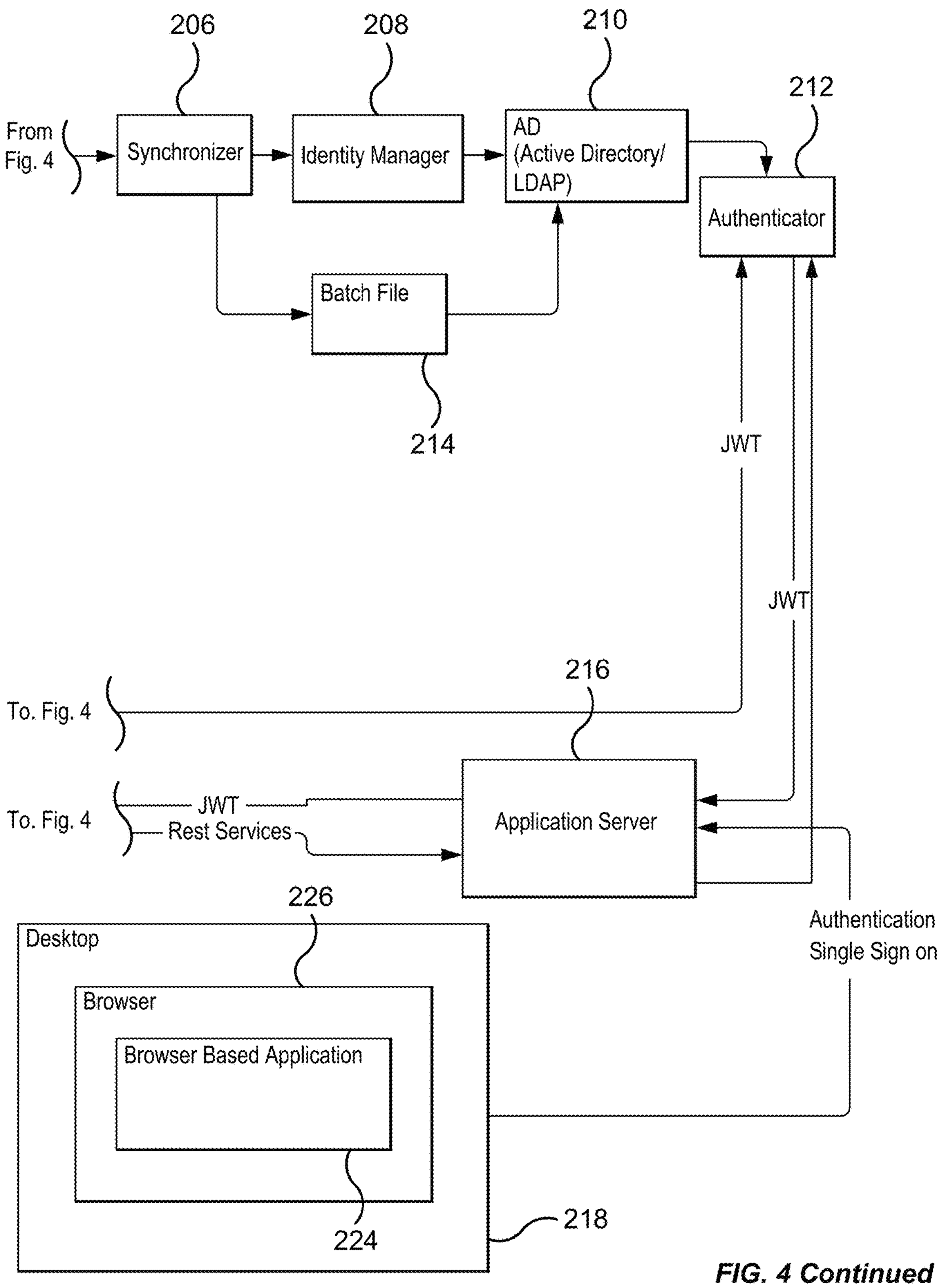

Turning now to FIG. 4, an authentication architecture 200 is illustrated. The authentication architecture 200 can generally be implemented in conjunction with any of the embodiments described herein, for example the single sign-on process 100 (FIG. 1), multi-user single sign-on process 150 (FIG. 2) and/or process 180 (FIG. 3). In FIG. 4, an access controller 202 is illustrated as part of a mainframe 204.

The access controller 202 is a security system for the mainframe 204. The access controller 202 stores mainframe IDs and permissions (e.g., access permissions) for the mainframe 204. When a user logins to the mainframe 204 through the desktop 218 and browser 226, the access controller 202 can be accessed to authenticate the user and determine access permissions for the user. The access controller 202 can store all user credentials and associated access permissions for the mainframe 204. Thus, a first user credentials (e.g., first mainframe ID) for a first user can have access permissions to read and write to first and second files of the mainframe 204, while second user credentials (second mainframe ID) can have access permissions to only read and not write to the first and second files of the enterprise network.

A synchronizer 206 is used to manage creating IDs on both access controller 202 and identity manager 208. The identity manager 208 creates mainframe ID's for the mainframe 204. The synchronizer 206 matches the mainframe IDs and associated attributes to the same attributes of an application username (e.g., user credentials) stored on active directory 210 and creates an association. That is, the synchronizer 206 matches mainframe IDs and the application username based on common attributes.

The identity manager 208 is used to manage identities for non-mainframe environments (e.g., enterprise environments) as well as mainframe IDs for the mainframe 204. The synchronizer 206 can create an association with the non-mainframe IDs (e.g., application usernames) with the mainframe IDs in some examples (e.g., mainframe ID one corresponds to non-mainframe ID one). In some examples, the synchronizer 206 does not create an association with the non-mainframe IDs and the mainframe IDs. The synchronizer 206 can be part of the mainframe 204 in some examples. In some examples, the synchronizer 206 generates mainframe IDs for accessing the mainframe 202.

The identity manager 208 can be a RACF® or a system that is used to manage identities within RACF®. The identity manager 208 can be a tool to manage the active directory 210 which is used for single sign on. So, when a user is added to the computing environment or removed, the identity manager 208 manages adding and/or removing the user's network id and/or the user's desktop login as well as global groups that provide the user access to non-mainframe systems.

The active directory 210 can be an implementation of Lightweight Directory Access Protocol (LDAP). When a user logins to an application server 216 through the desktop 218, the active directory 210 can be accessed to authenticate the user. The active directory 210 can store all user credentials and associated access permissions for the mainframe 204. Thus, first user credentials for a first user can have access permissions to read and write permissions to first, second and third databases of the enterprise network, while second user credentials can have access permissions to read the first and second databases of the enterprise network.

An authenticator 212 can authenticate users. The authenticator 212 can access the non-mainframe IDs in the active directory 210 to execute authentication.

The synchronizer 206 can periodically execute to retrieve mainframe IDs and associate the mainframe IDs with non-mainframe IDs. Some examples can use synchronizer 206 to pull the mainframe ID's and the non-mainframe IDs from access controller 202 and identity manager 208 respectively. The synchronizer 206 uses common attributes to determine a correspondence between mainframe ID's and non-mainframe IDs and stores the correspondence as the batch file 214. The batch file 214 is then stored in the active directory 210 and/or adds the mainframe IDs to the appropriate non-mainframe IDs in the active directory 210. The attributes can include employee ID, the name (e.g., first, middle and last Name), e-mail ID, etc. Other attributes can be included. Examples can also create an association manually for a one-off situation and enforce such an association in future instances. For example, the synchronizer 206 can use identifiers in the access controller 202 and identifiers in the active directory 210 to determine matches between the mainframe IDs and the non-mainframe IDs. The mainframe IDs can be stored as attributes in the active directory 210 in correspondence with the non-mainframe IDs. For example, a first mainframe ID that corresponds to a first non-mainframe ID is stored as an attribute of the first non-mainframe ID. The identity manager then adds the mainframe IDs (e.g., access controller and/or RACF IDs) to the appropriate non-mainframe ID in the active directory 210.

Notably, the synchronizer 206 can periodically and automatically execute to retrieve the mainframe IDs from the access controller 202, and associated the mainframe IDs with the non-mainframe IDs. As such, even if the mainframe IDs are changed, the active directory 210 can include accurate mainframe IDs. That is, the synchronizer 206 periodically synchronizes the active directory 210 with the access controller 202.

Thus, a single location, the active directory 210, stores both the mainframe IDs and the non-mainframe IDs. Notably, the active directory 210 is not stored on the mainframe 204, and is connected to the mainframe 204 over a network. Doing so permits a single sign-on process to be executed based on the non-mainframe IDs.

Authenticator 212 is used for authentication for most systems (e.g., browser based and desktop applications). The authenticator 212 pulls user information from active directory 210 to execute the single sign-on process.

The desktop 218 includes browser-based application 224 and desktop applications (not illustrated) to execute single sign-on with the application server 216 and the authenticator 212. Authentication single sign-on data is sent to the application server 216 to authenticate a user. In turn, the application server 216 provides the single sign-on data to the authenticator 212. The authenticator 212 can communicate with the active directory 210 to authenticate the authentication single sign-on against data of the active directory. For example, the authenticator 212 can determine whether an application username and password of the authentication single sign-on matches an application username and password of the active directory 210. In this case, the authentication single sign-on is authenticated. In response, the authenticator 212 provides a Java Web Token (JWT) to the application server 216. The JWT can include the mainframe ID of the user in a header of the JWT.

The browser-based application 224 (or desktop application) makes a call to a REST (Representational State Transfer) Service that is hosted on the mainframe 204. The application server 216 sends JWT provided by the authenticator 212 along with the REST Service Request that can be a request to access the mainframe 204. The JWT can be used to identify the user requesting the REST service.

The mainframe 204 can validate the JWT. For example, the mainframe 204 can send a request to the authenticator 212 to validate that the JWT is valid. For example, the mainframe 204 can provide the JWT and/or mainframe ID of the JWT to the authenticator 212. The authenticator 212 can confirm that the JWT is valid and is useable. When the JWT is confirmed to be valid, the authenticator 212 can provide the JMT to the mainframe 204 again for confirmation.

The mainframe 204 then uses the mainframe ID (e.g., access controller ID) that is encoded in the JWT and validates the mainframe ID against access controller 202. The mainframe 204 verifies that the mainframe ID is valid, active and in-use. The mainframe 204 then creates a pass ticket and creates an individual session (e.g., terminal) on the mainframe 204 using the user's mainframe ID 222. The individual session can be similar to an individual command prompt that is only accessible by the desktop 218 and/or actions associated with the mainframe ID. Mainframe transactions are run using the user's mainframe ID. Each user would have a different command prompt or terminal.

The JWT can be embedded in communications between the application server 216 and the mainframe 204. For example, the application server 216 can intercept communications between the desktop 218 and the mainframe 204. The application server 216 can identify that the communications originated from the desktop 218, identify that the desktop 218 is assigned the JWT, embed the JWT into the communications and provide the communications with the embedded JWT to the mainframe 204. The application server 216 can also operate with multiple desktops and execute similarly to as described herein with respect to each of the desktops. Furthermore, more than one application server 216 can be provided. That is, each application can have a distinct application server that operates similarly to the application server 216. The desktop 218 can operate with each of the application servers and have multiple sessions on the mainframe 204 controlled by the application servers.

All processes on the mainframe 204 can execute all transactions associated with the desktop 218 and/or user on the session described above. Thus, the transactions can be attributed to an individual desktop 218 and access permissions particular to the user can be enforced. Moreover, if an unauthorized action is detected, the mainframe 204 can terminate the session rapidly without affecting other users based on the session since the session is assigned to only the single mainframe ID.

Furthermore, the user does not actually enter the mainframe ID. Rather, the mainframe ID is automatically allocated and provided based on the non-mainframe ID. Doing so can provide security enhancements, including the ability to rapidly adjust and/or revoke a single mainframe ID access without having to revoke other mainframe IDs. For example, the single mainframe ID can be adjusted and/or revoked in response to malicious intrusions (e.g., if mainframe ID become comprised). Further, new mainframe IDs can be rapidly assigned without disturbing users.

Further, corresponding tokens of the mainframe IDs can be periodically changed. So, if a compromised token of a first mainframe ID is compromised, the compromised token will only be valid for a limited amount of time (e.g., thirty minutes) limiting the intrusion. After the compromised token expires, a new token will replace the compromised token, and the new token will be associated with the first mainframe ID. Since the first mainframe ID is never seen by the end user, the first mainframe ID is kept secure within systems described herein. If the first mainframe ID is compromised, unusual activity will be detected by the mainframe systems and the first mainframe ID can be dynamically and/or manually locked out. Also, mainframe IDs have minimal access rights. Tokens have greater access rights, thus are periodically changed. As such, by leveraging the rules created and managed by desktop/internet/cloud security, examples leverage a hardened security profile. This process increases that security by creating a hardened security process that allows examples to leverage the security processes that have been developed on the mainframe 204 to stop hackers and runaway processes. Furthermore, the users can rapidly and efficiently login to the mainframe 204 without having to execute multiple authentications.

Figure 5:
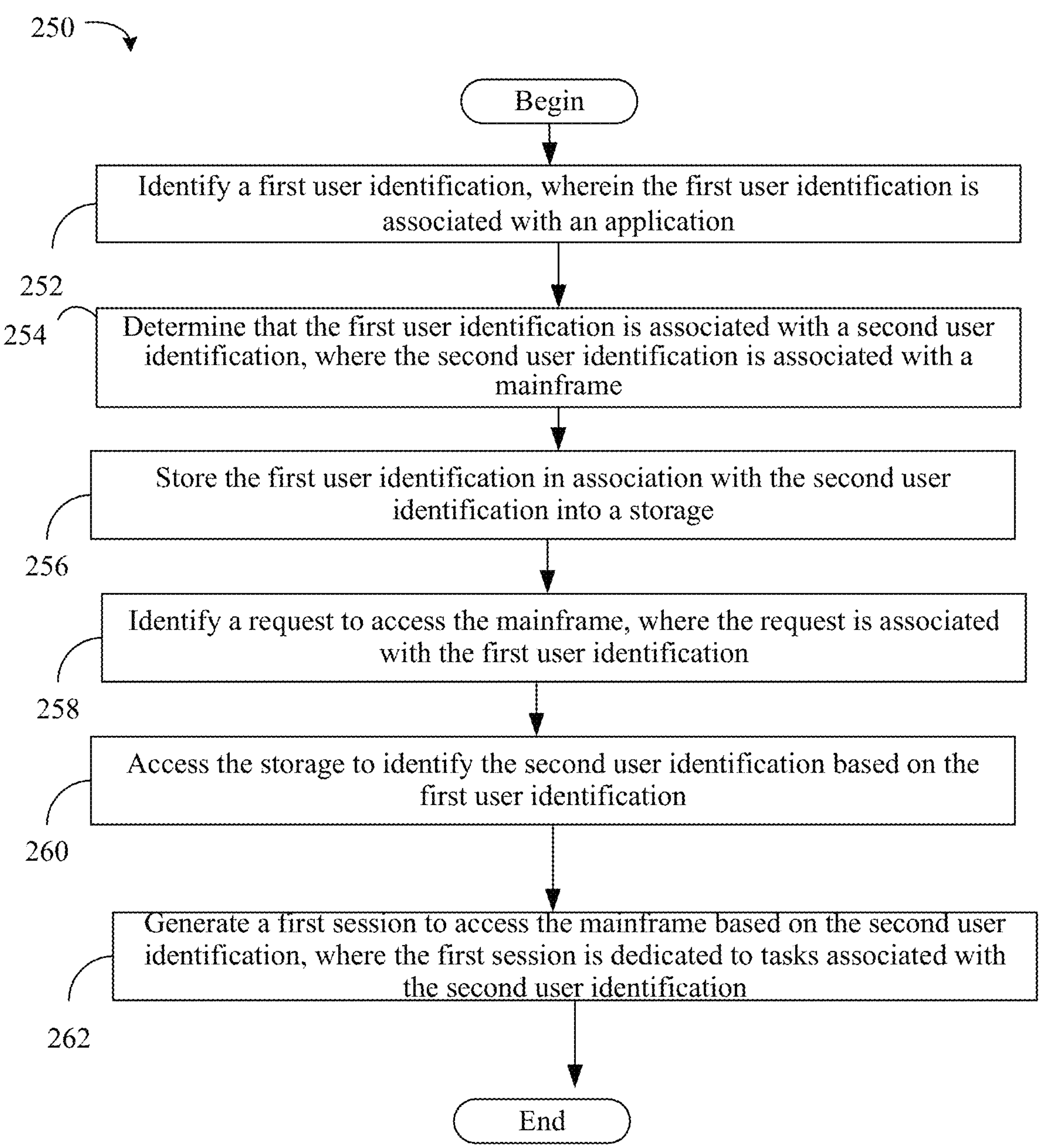
FIG. 5 is a flowchart of an example of enforcing access privileges according to an embodiment.

FIG. 5 illustrates a method 250 of enforcing access privileges. The method 250 can generally be implemented in conjunction with any of the embodiments described herein, for example the single sign-on process 100 (FIG. 1), multi-user single sign-on process 150 (FIG. 2), process 180 (FIG. 3) and/or authentication architecture 200 (FIG. 4). In an embodiment, the method 250 is implemented in logic instructions (e.g., software), configurable logic, fixed-functionality hardware logic, computer readable instructions stored on at least one non-transitory computer readable storage medium that are executable to implement method 250, circuitry, etc., or any combination thereof.

Illustrated processing block 252 identifies a first user identification, where the first user identification is associated with an application. Illustrated processing block 254 determines that the first user identification is associated with a second user identification, wherein the second user identification is associated with a mainframe. Illustrated processing block 256 stores the first user identification in association with the second user identification into a storage. Illustrated processing block 258 identifies a request to access the mainframe, where the request is associated with the first user identification. Illustrated processing block 260 accesses the storage to identify the second user identification based on the first user identification. Illustrated processing block 262 generates a first session to access the mainframe based on the second user identification, where the first session is dedicated to tasks associated with the second user identification.

In some example, the method 250 receives a third user identification associated with the application, accesses the storage to identify a fourth user identification based on the third user identification, where the fourth user identification is associated with the mainframe, generates a second session based on the fourth user identification, and operates the second session concurrently with the first session and independently of the first session, where the first user identification, the second user identification and the first session are associated with a first user, further where the third user identification, the fourth user identification and the second session are associated with a second user. In some examples, the method 250 further identifies that the second user identification is associated with first access privileges, identifies that a first action of the first session fails to correspond to the first access privileges, and terminates the first session in response to the first action failing to correspond to the first access privileges. In some examples, the method 250 further includes permitting the second session to continue after the first session is terminated. In some examples, the method 250 further includes identify that second access privileges are associated with the fourth user identification, where the first access privileges are a subset of the second access privileges.

In some examples, the method 250 includes executing a multi-user process to enable a plurality of sessions associated with different users to be executed in parallel and independently of each other, where the plurality of sessions includes the first session. In some examples, the method 250 further includes authenticating the first user identification, generating a token based on the first user identification being authenticated, where the token includes the second user identification, providing the token and a request for access to the mainframe, initiating, with the mainframe, a verification process to verify that the token and the second user identification are valid, and determining that the first session is to be generated based on the verification process.

Figure 6:
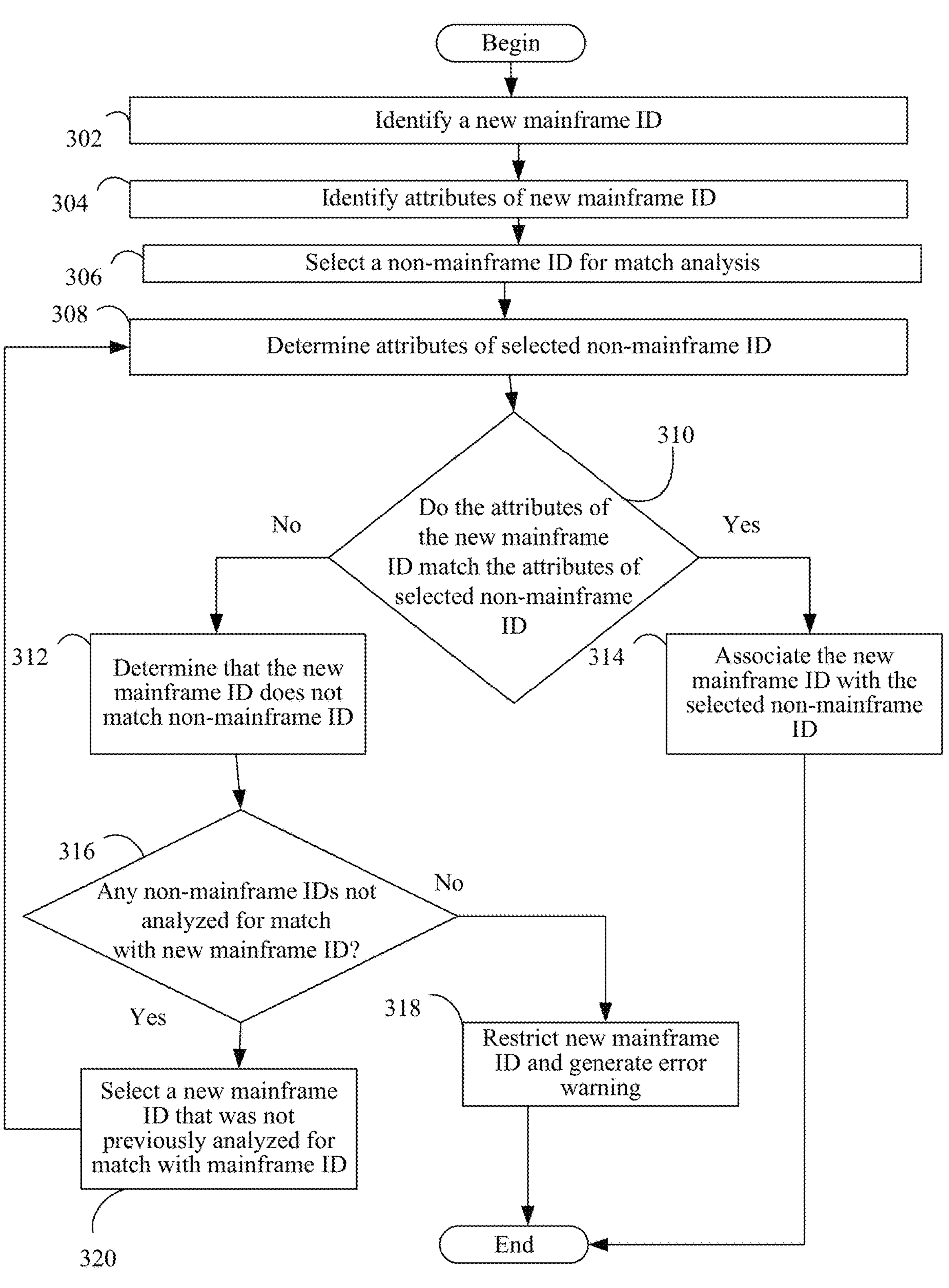
FIG. 6 is a flowchart of an example of associating mainframe IDs and non-mainframe IDs according to an embodiment.

FIG. 6 illustrates a method 300 of associating mainframe IDs and non-mainframe IDs (e.g., application usernames). The method 300 can generally be implemented in conjunction with any of the embodiments described herein, for example the single sign-on process 100 (FIG. 1), multi-user single sign-on process 150 (FIG. 2), process 180 (FIG. 3), authentication architecture 200 (FIG. 4) and/or method 250 (FIG. 5). In an embodiment, the method 300 is implemented in logic instructions (e.g., software), configurable logic, fixed-functionality hardware logic, computer readable instructions stored on at least one non-transitory computer readable storage medium that are executable to implement method 300, circuitry, etc., or any combination thereof. In some examples, the method 600 can execute prior to an authentication process to authenticate a user for signing onto an application and mainframe to facilitate the authentication process.

Illustrated processing block 302 identifies a new mainframe ID. For example, the mainframe can generate the new mainframe ID. Illustrated processing block 304 identifies attributes of a new mainframe ID. Illustrated processing block 306 selects a non-mainframe ID for match analysis. Illustrated processing block 308 determines attributes of selected non-mainframe ID. Illustrated processing block 310 determines if the attributes of the new mainframe ID match the attributes of the selected non-mainframe ID. If so, illustrated processing block 314 associates the new mainframe ID with the selected non-mainframe ID. Otherwise, illustrated processing block 312 determines that the new mainframe ID does not match the non-mainframe ID. Illustrated processing block 316 determines if any non-mainframe IDs are not analyzed for match with the new mainframe ID. If not, no match was found for the new mainframe ID, and illustrated processing block 318 restricts the new mainframe ID (e.g., read-only capability, limited access privileges, locked down, etc.) and generates an error warning. The error warning can be provided to a human operator for further investigation.

If illustrated processing block 316 determines that a non-mainframe ID was not analyzed, then processing block 320 selects a new mainframe ID that was not previously analyzed for match with the mainframe ID.

Figure 7:
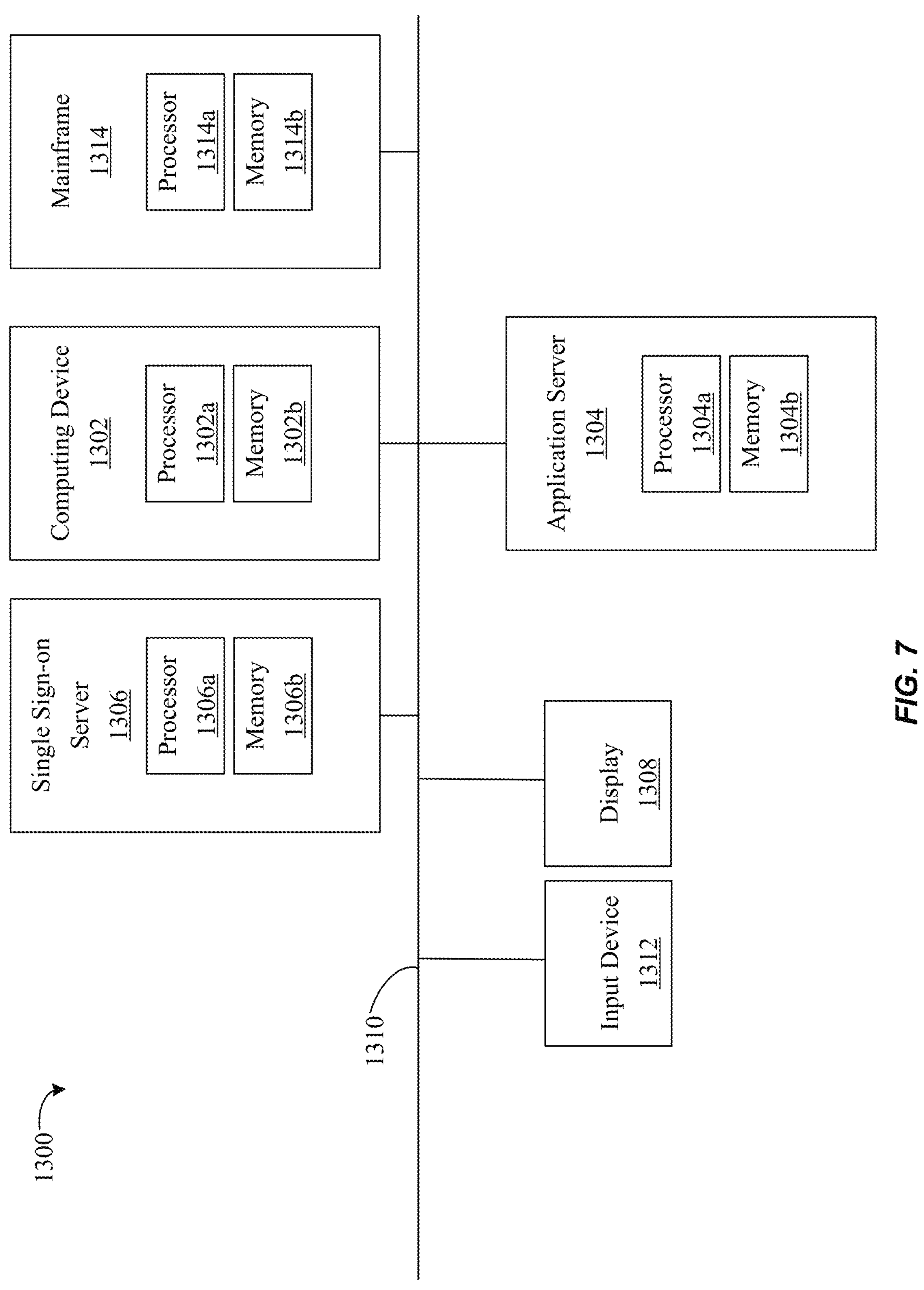
FIG. 7 is a block diagram of an example of a computing system according to an embodiment.

FIG. 7 shows a more detailed example of a computing system 1300 to execute secure mainframe operations. The illustrated computing system 1300 can be readily implement aspects related to, for example, the computing system 1300 can generally be implemented in conjunction with any of the embodiments described herein, for example the single sign-on process 100 (FIG. 1), multi-user single sign-on process 150 (FIG. 2), process 180 (FIG. 3), authentication architecture 200 (FIG. 4), method 250 (FIG. 5) and/or method 300 (FIG. 6).

In the illustrated example, the computing system 1300 can include a network 1310 that can facilitate communicate between the single sign-on server 1306, computing device 1302, application server 1304, mainframe 1314, display 1308 and input device 1312. The display 1308 (e.g., audio and/or visual interface) can present a browser to a user, and the input device 1312 can receive user inputs (e.g., user login credentials and/or single sign-on data).

A computing device 1302 includes a processor **1302*a* (e.g., embedded controller, central processing unit/CPU) and a memory 1302*b* (e.g., non-volatile memory/NVM and/or volatile memory) containing a set of instructions, which when executed by the processor 1302*a*, cause the computing device 1302 to implement aspects described herein, for example causing a browser to be presented on the display 1308 and processing single sign-on data from the input device 1312. The application server 1304 includes a processor 1304*a* (e.g., embedded controller, central processing unit/CPU) and a memory 1304*b* (e.g., non-volatile memory/NVM and/or volatile memory) containing a set of instructions, which when executed by the processor 1304*a*, cause the application server 1304 to implement aspects described herein, for example causing the single sign-on data to be authenticated with the single sign-on server 1306, hosting an application and/or providing instructions to the mainframe 1314**.

The single sign-on server 1306 includes a processor **1306*a* (e.g., embedded controller, central processing unit/CPU) and a memory 1306*b* (e.g., non-volatile memory/NVM and/or volatile memory) containing a set of instructions, which when executed by the processor 1306*a*, cause the single sign-on server 1306 to implement aspects described herein, for example authenticating the single sign-on data and identifying a mainframe ID based on the single sign-on data. The mainframe 1314 includes a processor 1314*a* (e.g., embedded controller, central processing unit/CPU) and a memory 1314*b* (e.g., non-volatile memory/NVM and/or volatile memory) containing a set of instructions, which when executed by the processor 1314*a*, cause the mainframe 1314 to implement aspects described herein, for example executing instructions on behalf of an application hosted by the application server 1304**.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

The term "coupled" can be used herein to refer to any type of relationship, direct or indirect, between the components in question, and can apply to electrical, mechanical, fluid, optical, electromagnetic, electromechanical or other connections. In addition, the terms "first", "second", etc. can be used herein only to facilitate discussion, and carry no particular temporal or chronological significance unless otherwise indicated.

Those skilled in the art will appreciate from the foregoing description that the broad techniques of the embodiments of the present disclosure can be implemented in a variety of forms. Therefore, while the embodiments of this disclosure have been described in connection with particular examples thereof, the true scope of the embodiments of the disclosure should not be so limited since other modifications will become apparent to the skilled practitioner upon a study of the drawings, specification, and following claims.

I claim:

1. A computing system comprising:

processors; and memories having a set of instructions, which when executed by the processors, cause the computing system to:

identify, with a server, a first user identification, wherein the first user identification is login credentials to login to an application outside a mainframe;

determine, with the server, that the first user identification is associated with a second user identification, wherein the second user identification is separate from the first user identification and includes login credentials to login to the mainframe;

store, with the server, the first user identification in association with the second user identification into a storage;

receive, with the server, the first user identification during a login process;

retrieve, with the server, the second user identification from the storage based on the first user identification received during the login process;

generate, with the server, a first token that encodes the second user identification retrieved from the storage;

receive, with the mainframe, the first token and a first request to access the mainframe;

decode, with the mainframe, the second user identification from the first token;

verify, with the mainframe, the first token and the second user identification; and generate, with the mainframe, a first session to access the mainframe based on the first token and the second user identification being verified by the mainframe, and by logging into the mainframe using the second user identification decoded from the first token, wherein the first session on the mainframe is dedicated to tasks associated with the second user identification; and wherein the set of instructions further include:

authenticate the first user identification; and generate the first token based on the first user identification being authenticated;

wherein to verify, with the mainframe, the first token and the second user identification, the instructions of the memories, when executed, cause the computing system to:

transmit, with the mainframe, a second request to the server for validation of the first token, wherein the second request includes the second user identification;

provide, with the server and in response to the second request, a second token to the mainframe corresponding to the second user identification, wherein the second token has a different filter on information than the first token, wherein the first token stores the second user identification in a header of the first token;

determine, with the mainframe, that the first token matches the second token;

validate, with the mainframe, the first token based on the first token matching the second token; and in response to the first token being validated, validating, with the mainframe, the second user identification against an internal storage of the mainframe that stores mainframe identifications that are permitted to access the mainframe.

2. The computing system of claim 1, wherein the instructions of the memories, when executed, cause the computing system to:

receive a third user identification associated with the application;

access the storage to identify a fourth user identification based on the third user identification, wherein the fourth user identification is associated with the mainframe;

generate a second session based on the fourth user identification; and operate the second session concurrently with the first session and independently of the first session, wherein the first user identification, the second user identification and the first session are associated with a first user, further wherein the third user identification, the fourth user identification and the second session are associated with a second user.

3. The computing system of claim 2, wherein the instructions of the memories, when executed, cause the computing system to:

identify that the second user identification is associated with first access privileges;

identify that a first action of the first session fails to correspond to the first access privileges; and terminate the first session in response to the first action failing to correspond to the first access privileges.

4. The computing system of claim 3, wherein the instructions of the memories, when executed, cause the computing system to:

permit the second session to continue after the first session is terminated.

5. The computing system of claim 3, wherein the instructions of the memories, when executed, cause the computing system to:

identify that second access privileges are associated with the fourth user identification, wherein the first access privileges are a subset of the second access privileges.

6. The computing system of claim 1, wherein the instructions of the memories, when executed, cause the computing system to:

execute a multi-user process to enable a plurality of sessions associated with different users to be executed in parallel and independently of each other, wherein the plurality of sessions includes the first session;

revoke the first token based on a periodic change to tokens associated with the mainframe;

generate a second token based on the second user identification to replace the first token; and generate a second session to access the mainframe based on the second token, wherein the first and second tokens have greater access rights than access rights of the second user identification.

7. At least one non-transitory computer readable storage medium comprising a set of instructions, which when executed by a computing system, cause the computing system to:

identify, with a server, a first user identification, wherein the first user identification is login credentials to login to an application outside a mainframe;

determine, with the server, that the first user identification is associated with a second user identification, wherein the second user identification is separate from the first user identification and includes login credentials to login to the mainframe;

store, with the server, the first user identification in association with the second user identification into a storage;

receive, with the server, the first user identification during a login process;

retrieve, with the server, the second user identification from the storage based on the first user identification received during the login process;

generate, with the server, a first token that encodes the second user identification retrieved from the storage;

receive, with the mainframe, the first token and a first request to access the mainframe;

decode, with the mainframe, the second user identification from the first token;

verify, with the mainframe, the first token and the second user identification;

generate, with the mainframe, a first session to access the mainframe based on the first token and the second user identification being verified by the mainframe, and by logging into the mainframe using the second user identification decoded from the first token, wherein the first session is dedicated to tasks associated with the second user identification;

authenticate the first user identification;

generate the first token based on the first user identification being authenticated, wherein the token includes the second user identification;

wherein to verify, with the mainframe, the first token and the second user identification, the instructions, when executed, cause the computing system to, when executed, cause the computing system to:

transmit, with the mainframe, a second request to the server for validation of the first token, wherein the second request includes the second user identification;

provide, with the server and in response to the second request for validation, a second token to the mainframe corresponding to the second user identification, wherein the second token has a different filter on information than the first token, wherein the first token stores the second user identification in a header of the first token;

determine, with the mainframe, that the first token matches the second token;

validate, with the mainframe, the first token based on the first token matching the second token; and in response to the first token being validated, validating, with the mainframe, the second user identification against an internal storage of the mainframe that stores mainframe identifications that are permitted to access the mainframe.

8. The at least one non-transitory computer readable storage medium of claim 7, wherein the instructions, when executed, cause the computing system to:

receive a third user identification associated with the application;

access the storage to identify a fourth user identification based on the third user identification, wherein the fourth user identification is associated with the mainframe;

generate a second session based on the fourth user identification; and operate the second session concurrently with the first session and independently of the first session, wherein the first user identification, the second user identification and the first session are associated with a first user, further wherein the third user identification, the fourth user identification and the second session are associated with a second user.

9. The at least one non-transitory computer readable storage medium of claim 8, wherein the instructions, when executed, cause the computing system to:

identify that the second user identification is associated with first access privileges;

identify that a first action of the first session fails to correspond to the first access privileges; and terminate the first session in response to the first action failing to correspond to the first access privileges.

10. The at least one non-transitory computer readable storage medium of claim 9, wherein the instructions, when executed, cause the computing system to:

permit the second session to continue after the first session is terminated.

11. The at least one non-transitory computer readable storage medium of claim 9, wherein the instructions, when executed, cause the computing system to:

identify that second access privileges are associated with the fourth user identification, wherein the first access privileges are a subset of the second access privileges.

12. The at least one non-transitory computer readable storage medium of claim 7, wherein the instructions, when executed, cause the computing system to:

execute a multi-user process to enable a plurality of sessions associated with different users to be executed in parallel and independently of each other, wherein the plurality of sessions includes the first session;

revoke the first token based on a periodic change to tokens associated with the mainframe;

generate a second token based on the second user identification to replace the first token; and generate a second session to access the mainframe based on the second token, wherein the first and second tokens have greater access rights than access rights of the second user identification.

13. A method comprising:

identifying, with a server, a first user identification, wherein the first user identification is login credentials to login to an application;

determining, with the server, that the first user identification is associated with a second user identification, wherein the second user identification is separate from the first user identification and includes login credentials to login to a mainframe;

storing, with the server, the first user identification in association with the second user identification into a storage;

receive, with the server, the first user identification during a login process;

retrieve, with the server, the second user identification from the storage based on the first user identification received during the login process;

generating, with the server, a first token that encodes the second user identification retrieved from the storage;

receiving, with the mainframe, the first token and a first request to access the mainframe;

decoding, with the mainframe, the second user identification from the first token;

verifying, with the mainframe, the first token and the second user identification;

generating, with the mainframe, a first session to access the mainframe based on the first token and the second user identification being verified by the mainframe, and by logging into the mainframe using the second user identification decoded from the first token, wherein the first session is dedicated to tasks associated with the second user identification;

authenticating the first user identification; and generating the first token based on the first user identification being authenticated;

wherein the verifying comprises:

transmitting, with the mainframe, a second request to the server for validation of the first token, wherein the second request includes the second user identification;

providing, with the server and in response to the second request for validation, a second token to the mainframe corresponding to the second user identification, wherein the second token has a different filter on information than the first token, wherein the first token stores the second user identification in a header of the first token;

determining, with the mainframe, that the first token matches the second token; and validating, with the mainframe, the first token based on the first token matching the second token;

in response to the first token being validated, validating, with the mainframe, the second user identification against an internal storage of the mainframe that stores mainframe identifications that are permitted to access the mainframe;

revoking the first token based on a periodic change to tokens associated with the mainframe;

generating a third token based on the second user identification to replace the first token; and generating a second session to access the mainframe based on the third token, wherein the first and third tokens have greater access rights than access rights of the second user identification.

14. The method of claim 13, comprising:

receiving a third user identification associated with the application;

accessing the storage to identify a fourth user identification based on the third user identification, wherein the fourth user identification is associated with the mainframe;

generating a second session based on the fourth user identification; and operating the second session concurrently with the first session and independently of the first session, wherein the first user identification, the second user identification and the first session are associated with a first user, further wherein the third user identification, the fourth user identification and the second session are associated with a second user.

15. The method of claim 14, comprising:

identifying that the second user identification is associated with first access privileges;

identifying that a first action of the first session fails to correspond to the first access privileges; and terminating the first session in response to the first action failing to correspond to the first access privileges.

16. The method of claim 15, comprising:

permitting the second session to continue after the first session is terminated.

17. The method of claim 15, comprising:

identifying that second access privileges are associated with the fourth user identification, wherein the first access privileges are a subset of the second access privileges.

* * * * *